June 18, 1929.  H. N. DENNY  1,717,963
COFFEE PERCOLATOR TOP
Filed July 23, 1928
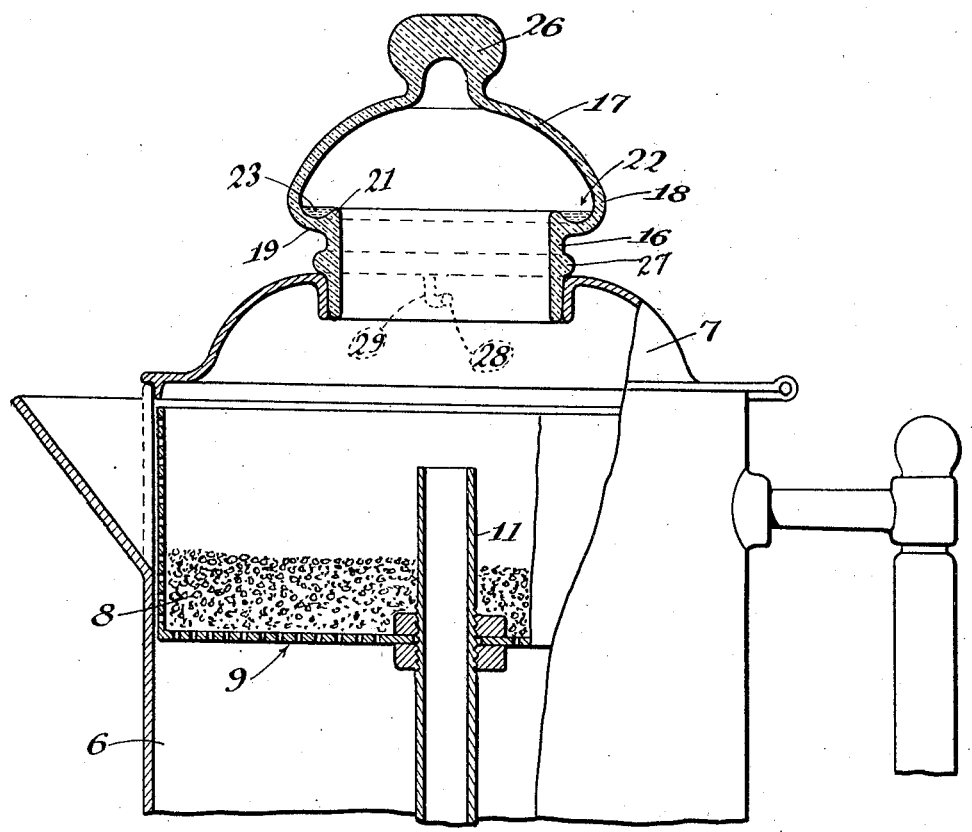
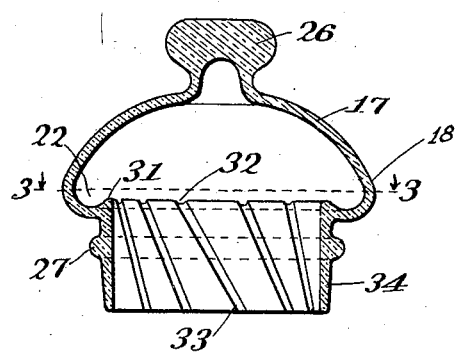
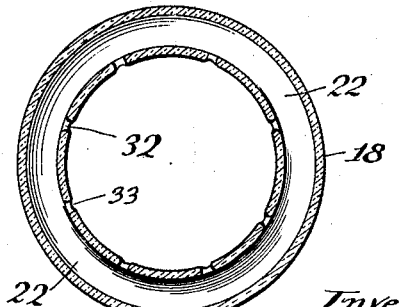
Inventor
H. N. Denny
by Hazard and Miller
Attorneys.

Patented June 18, 1929.

1,717,963

UNITED STATES PATENT OFFICE.

HOSEA N. DENNY, OF LOS ANGELES, CALIFORNIA.

COFFEE-PERCOLATOR TOP.

Application filed July 23, 1928. Serial No. 294,695.

My invention is an improved top for use upon percolators such as those used in the process of making coffee.

An object of the invention is the provision of an improved type of percolator top made of transparent material such as glass, and including a pocket formed in the inner surface thereof. This pocket opens upwards into the interior of the top for the reception of a portion of the liquid coffee, so that a sufficient volume may accumulate to permit observation thereof to determine the strength of the coffee by observing the color of the liquid.

Another object is the provision of a percolator top of the general class described, of very simple and inexpensive construction, and of such standard dimensions that it is adapted to supplant the conventional type.

The invention possesses other objects and advantageous features, some of which, with these enumerated, will be set forth in the following description of the invention's particular embodiment which is illustrated in the drawings accompanying and forming a part of the specification.

The form of construction herein disclosed, has in actual use, proven to be very efficient, capable of facile and rapid operation, and generally desirable in other respects. For these reasons, the details herein disclosed may be considered as preferred. It should be mentioned however, that while these details will hereinafter be specifically described, variations may be effected within the scope of the invention as claimed.

Referring to the drawings:

Figure 1 is a view partly in vertical section and partly in side elevation, of a percolator with the improved top of my invention in operative position thereupon.

Fig. 2 is a vertical sectional view of a slightly modified form of the percolator top.

Fig. 3 is a horizontal sectional view taken upon the line 3—3 of Fig. 2, with the direction of view indicated by the arrows.

The percolator top of my invention is intended to be used with the conventional coffee percolator such as that disclosed upon Fig. 1, and including a body portion 6 having a lid 7, and within which ground coffee 8 is disposed adjacent the top of the body portion 6 within a basket or strainer 9 which is supported upon a tube 11. The tube 11 is disposed vertically and axially of the body portion 6, and is adapted when heat is applied to the bottom of the body portion 6 and fluid such as water is contained within the body portion 6, to direct a jet of the boiling water upwards against the lid 7, this action resulting from the formation of steam at the lower end of the tube 11. It is to be understood that after the jet from the tube 11 has struck the lid 7, the water falls back upon the ground coffee 8 and percolates therethrough, extracting the flavor of coffee in passing therethrough, after which the liquid passes through the strainer 9 and falls to the bottom of the body portion 6.

The details above described are purely conventional and form no portion of the present invention, being here presented merely for the purpose of facilitating the explanation of the use of the percolator top of my invention.

It has previously been common practice to provide the lid 7 of such percolators, with a glass top, roughly bell shaped, into which the jet of liquid from the tube 11 is ejected. This permits observation to determine when the percolator is operating satisfactorily. My invention contemplates the provision of a pocket within percolator tops of this character, and within which a quantity of the liquid ejected by the tube 11 may collect, so that the strength of the coffee may be determined by observation of the color of the liquid thus collected.

With this broad conception of the invention in view, the most practical form of my improved percolator top of which I am at present aware, comprises a cylindrical portion 16 and a bell-shaped portion 17 closing the upper end thereof. The bottom 18 of the bell-shaped portion 17 is of greater diameter than the cylindrical portion 16, necessitating that the two portions be joined by a radially disposed flange 19. An upstanding annular bead 21 is disposed about the inner circumference of the flange 19, this bead being in reality, a continuation of the cylindrical portion 16 above the upper surface of the flange 19, to form an annular pocket 22 in the inner wall and at the bottom of the bell-shaped portion 17 opening upwards into the interior thereof.

This construction makes possible the accumulation of a certain quantity of liquid 23 from the tube 11, after its jet has been intercepted by the percolator top. Since it is intended that the top be constructed of transparent material such as glass, the accumulated liquid 23 within the pocket 22 may be readily observed, it being understood that the strength of the percolated coffee may be determined by the color of the liquid.

A knob 26 is formed upon the top, serving as convenient gripping means; and a bead 27 is formed upon the outer circumference of the cylindrical portion 16 to limit the distance to which the top is thrust into the lid 7. The cylindrical portion 16 is further provided with preferably a pair of lugs 28 receivable within slots 29 to prevent inadvertent displacement of the top from the lid 7.

A slightly modified form of construction is shown upon Figs. 2 and 3. The top herein shown is in all respects similar to that of Fig. 1, with the exception that the upstanding bead 31 is provided with a plurality of notches 32 in its upper edge; and a groove 33 extends downwards from each of the notches 32 within the inner surface of the cylindrical portion 34. The provision of the notches 32 and grooves 33 serves to more equally distribute the fluid flowing from the pocket 22 over the bead 21 and dripping onto the ground coffee 8.

I claim:

1. In a percolator top, a glass shell comprising a cylindrical portion and a bell-shaped portion closing the upper end thereof, the bottom of said bell-shaped portion exceeding in diameter the cylindrical portion and being connected thereto by a radially disposed flange, and an upstanding annular bead at the inner circumference of said flange forming an annular pocket opening upwards into the bell-shaped portion.

2. In a percolator top, a glass shell comprising a cylindrical portion and a bell-shaped portion closing the upper end thereof, the bottom of said bell-shaped portion exceeding in diameter the cylindrical portion and being connected thereto by a radially disposed flange, an upstanding annular bead at the inner circumference of said flange forming an annular pocket opening upwards into the bell-shaped portion, and means for positioning said top from the lid of the percolator.

3. In a percolator top, a glass shell comprising a cylindrical portion and a bell-shaped portion closing the upper end thereof, the bottom of said bell-shaped portion exceeding in diameter the cylindrical portion and being connected thereto by a radially disposed flange, an upstanding annular bead at the inner circumference of said flange forming an annular pocket opening upwards into the bell-shaped portion having a plurality of notches in its upper edge and said cylindrical portion having a groove extending downwards in its inner circumference from each of said notches, and means for positioning said top from the lid of the percolator.

4. A percolator top comprising a dome-shaped transparent body adapted to be mounted on a percolator cover, said body having a pocket formed upon its interior which opens upwardly.

5. A percolator top comprising a transparent dome-shaped body adapted to be mounted on a percolator cover, said body having an interior annular groove thereon forming an upwardly opening pocket.

6. A percolator top comprising a closed dome shaped transparent top having a pocket on its interior whereby coffee may issue from the percolator, impinge against the top, be caught in the pocket and overflow therefrom into the percolator, and while in the pocket be inspected through the top.

7. A percolator top comprising a closed dome shaped transparent top having a relatively shallow annular pocket on its interior whereby coffee may issue from the percolator, impinge against the top, be caught in the pocket and overflow therefrom into the percolator, and while in the pocket be inspected through the top.

In testimony whereof I have signed my name to this specification.

HOSEA N. DENNY.